US010643770B2

(12) United States Patent
Imamura et al.

(10) Patent No.: US 10,643,770 B2
(45) Date of Patent: May 5, 2020

(54) GRAIN-ORIENTED ELECTRICAL STEEL SHEET

(71) Applicant: JFE STEEL CORPORATION, Tokyo (JP)

(72) Inventors: Takeshi Imamura, Kurashiki (JP); Yukihiro Shingaki, Kurashiki (JP); Ryuichi Suehiro, Kurashiki (JP); Toshito Takamiya, Kurashiki (JP)

(73) Assignee: JFE STEEL CORPORATION, Tokyo (JP)

(*) Notice: Subject to any disclaimer, the term of this patent is extended or adjusted under 35 U.S.C. 154(b) by 541 days.

(21) Appl. No.: 14/437,743

(22) PCT Filed: Dec. 11, 2013

(86) PCT No.: PCT/JP2013/083150
§ 371 (c)(1),
(2) Date: Apr. 22, 2015

(87) PCT Pub. No.: WO2014/092102
PCT Pub. Date: Jun. 19, 2014

(65) Prior Publication Data
US 2015/0318090 A1    Nov. 5, 2015

(30) Foreign Application Priority Data
Dec. 12, 2012  (JP) ................ 2012-271080

(51) Int. Cl.
C21D 8/12      (2006.01)
H01F 1/147     (2006.01)
(Continued)

(52) U.S. Cl.
CPC ....... H01F 1/14775 (2013.01); C21D 8/1255 (2013.01); C21D 8/1272 (2013.01);
(Continued)

(58) Field of Classification Search
None
See application file for complete search history.

(56) References Cited

U.S. PATENT DOCUMENTS 6,296,719 B1   10/2001  Fortunati et al.
7,815,754 B2 * 10/2010  Ushigami ............ C22C 38/02
                                                  148/308
(Continued)

FOREIGN PATENT DOCUMENTS

CN    101194032 A    6/2008
CN    102471850 A    5/2012
(Continued)

OTHER PUBLICATIONS

Jun. 2, 2015 Office Action issued in Japanese Patent Application No. 2012-271080.
(Continued)

Primary Examiner — Colleen P Dunn
Assistant Examiner — Nicholas A Wang
(74) Attorney, Agent, or Firm — Oliff PLC

(57) ABSTRACT

When a steel sheet containing Si: 2-5 mass % after cold rolling is subjected to a primary recrystallization annealing and a finishing annealing for secondary recrystallization to form a grain-oriented electrical steel sheet, the primary recrystallization annealing is performed by rapid heating in the heating process and temperature keeping treatment at a certain temperature in the course of the heating to thereby obtain a grain-oriented electrical steel sheet having plural peaks in a distribution of misorientation angle between crystal orientation of secondary recrystallized grains and Goss orientation, wherein misorientation angle of the second smallest peak among the plural peaks is preferably not less than 5° and a grain size of secondary recrystallized grains is not more than 15 mm.

10 Claims, 3 Drawing Sheets

(51) Int. Cl.

| | |
|---|---|
| *C22C 38/40* | (2006.01) |
| *C22C 38/16* | (2006.01) |
| *C22C 38/02* | (2006.01) |
| *C22C 38/60* | (2006.01) |
| *H01F 1/16* | (2006.01) |
| *C22C 38/00* | (2006.01) |
| *C22C 38/04* | (2006.01) |
| *C22C 38/06* | (2006.01) |
| *C22C 38/12* | (2006.01) |
| *C22C 38/20* | (2006.01) |
| *C22C 38/34* | (2006.01) |

(52) U.S. Cl.
CPC ............ *C22C 38/00* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/12* (2013.01); *C22C 38/16* (2013.01); *C22C 38/20* (2013.01); *C22C 38/34* (2013.01); *C22C 38/40* (2013.01); *C22C 38/60* (2013.01); *H01F 1/16* (2013.01); *C21D 8/12* (2013.01); *C21D 2201/05* (2013.01); *Y02P 10/212* (2015.11)

(56) References Cited

U.S. PATENT DOCUMENTS

| | | |
|---|---|---|
| 2009/0044881 A1 | 2/2009 | Kumano et al. |
| 2010/0055481 A1 | 3/2010 | Kubo et al. |
| 2013/0074996 A1 | 3/2013 | Omura et al. |
| 2013/0129984 A1 | 5/2013 | Omura et al. |

FOREIGN PATENT DOCUMENTS

| | | |
|---|---|---|
| CN | 102812133 A | 12/2012 |
| EP | 0 339 475 A2 | 11/1989 |
| EP | 2 039 792 A1 | 3/2009 |
| EP | 2 460 902 A1 | 6/2012 |
| JP | S60245769 A | 12/1985 |
| JP | S63-105926 A | 5/1988 |
| JP | S63105926 * | 5/1988 |
| JP | H07-62436 A | 3/1995 |
| JP | H10-130729 A | 5/1998 |
| JP | H10-298653 A | 11/1998 |
| JP | 2003027194 A | 1/2003 |
| JP | 2007314826 A | 12/2007 |
| JP | 2009-235574 A | 10/2009 |
| JP | 2009-256713 A | 11/2009 |
| JP | 2012126989 A | 7/2012 |
| JP | 2013047382 A | 3/2013 |
| RU | 2194775 C2 | 12/2002 |
| RU | 2405842 C1 | 12/2010 |
| WO | 2012/017690 A1 | 2/2012 |

OTHER PUBLICATIONS

Apr. 5, 2016 Office Action issued in Chinese Patent Application No. 201380063743.7.
Feb. 24, 2016 extended Search Report issued in European Patent Application No. 13862090.1.
Aug. 18, 2016 Office Action issued in Korean Patent Application No. 2015-7010707.
Sep. 8, 2016 Office Action issued in Russian Patent Application No. 2015128023.
Mar. 11, 2014 International Search Report issued in International Application No. PCT/JP2013/083150.
Dec. 21, 2016 Office Action issued in Chinese Patent Application No. 201380063743.7.
Sep. 22, 2017 Office Action issued in European Patent Application No. 13 862 090.1.

* cited by examiner

GRAIN-ORIENTED ELECTRICAL STEEL SHEET

TECHNICAL FIELD

This invention relates to a grain-oriented electrical steel sheet suitable for use as an iron-core material or the like for transformer and electric equipment.

RELATED ART

An electrical steel sheet is a soft magnetic material widely used as an iron core or the like for a transformer or a motor. Among them, a grain-oriented electrical steel sheet is excellent in magnetic properties because crystal orientation thereof is highly accumulated in {110}<001> orientation called Goss orientation, and is mainly used as an iron core or the like for large-size transformers. In order to reduce no-load loss (energy loss) in the transformer, it is necessary for the iron core to be low in the iron loss. In the grain-oriented electrical steel sheet, increase of Si content, decrease of sheet thickness, improvement of crystal orientation, application of tension to steel sheet, smoothening of steel sheet surface, refining of secondary recrystallized grains and so on are known to be effective as a method of decreasing the iron loss.

As a method of refining secondary recrystallized grains among these methods is proposed a method wherein a primary recrystallized texture is improved by rapidly heating during decarburization annealing or by performing heat treatment for rapid heating just before decarburization annealing. For example, Patent Document 1 discloses a technique wherein a cold rolled steel sheet rolled to a final thickness is rapidly heated to a temperature of not lower than 700° C. at a rate of not less than 100° C./s in a non-oxidizing atmosphere with $P_{H2O}/P_{H2}$ of not more than 0.2 to provide a grain-oriented electrical steel sheet with a low iron loss. Also, Patent Document 2 discloses a technique wherein a grain-oriented electrical steel sheet with a low iron loss is obtained by rapidly heating the sheet to 800-950° C. at a heating rate of not less than 100° C./s in an atmosphere having an oxygen concentration of not more than 500 ppm, keeping at a temperature of 775-840° C. which is lower than the temperature of the rapid heating and subsequently keeping at a temperature of 815-875° C. Furthermore, Patent Document 3 discloses a technique wherein an electrical steel sheet having excellent coating property and magnetic properties is obtained by heating a temperature zone of not lower than 600° C. to not lower than 800° C. at a heating rate of not less than 95° C./s and properly controlling an atmosphere of this temperature zone. In addition, Patent Document 4 discloses a technique wherein a grain-oriented electrical steel sheet with a low iron loss is obtained by restricting N content in a hot rolled sheet to not more than 25 ppm as MN and heating the sheet to not lower than 700° C. at a heating rate of not less than 80° C./s during decarburization annealing.

These techniques of improving the primary recrystallized texture by rapid heating unambiguously define a temperature for rapid heating to a range from room temperature to not lower than 700° C. as well as a temperature rising rate. This technical idea intends to improve the primary recrystallized texture by raising the temperature near to recrystallization temperature for a short time to suppress development of γ-fiber ({111}/ND orientation), which is preferentially formed in the usual heating rate, and to promote generation of {110}<001> texture as a secondary recrystallization nucleus. Also, it is known that crystal grains after secondary recrystallization (Goss-oriented grains) are refined to improve iron loss property by applying this technique.

PRIOR ART DOCUMENTS

Patent Documents

Patent Document 1: JP-A-H07-062436
Patent Document 2: JP-A-H10-298653
Patent Document 3: JP-A-2003-027194
Patent Document 4: JP-A-H10-130729

SUMMARY OF THE INVENTION

Problem to be Solved by the Invention

Although the iron loss property of the grain-oriented electrical steel sheet is largely improved by applying the conventional techniques, it is necessary to further reduce the iron loss in order to meet the needs for energy saving in recent years. However, in order to further reduce the iron loss by the conventional techniques, it is required to further increase the heating rate as compared to the conventional ones. To this end, it is necessary to make larger a size of an induction heating device or an electric heating device and a current therefor, which brings about the increase of equipment cost and production cost. Furthermore, the excessive increase of the heating rate causes problems that temperature variation in the steel sheet is widened and the shape of the steel sheet is worsened to deteriorate a sheet threading property to a production line and the deviation of magnetic properties in a product sheet is widened. In the grain-oriented electrical steel sheets produced by the conventional techniques, therefore, there is a limitation in the further improvement of the magnetic properties.

The invention is made in consideration of the above problems inherent to the conventional techniques and is to provide a grain-oriented electrical steel sheet which can refine secondary recrystallized grains without excessively increasing the heating rate in primary recrystallization annealing and is superior in the iron loss property to the conventional material.

Solution for Problem

The inventors have made various studies in order to solve the problems. As a result, it has been found that a low iron loss can be attained without requiring excessive rapid heating in steel sheets wherein a distribution of misorientation angle between crystal orientation of secondary recrystallized grain and Goss orientation in a product sheet is plural peaks of two or more and a grain size of secondary recrystallized grains is made to not more than 15 mm, and the invention has been accomplished.

That is, the invention is a grain-oriented electrical steel sheet characterized by containing Si: 2-5 mass %, and having plural peaks in a distribution of misorientation angle between crystal orientation of secondary recrystallized grain and Goss orientation and a grain size of secondary recrystallized grains of not more than 15 mm.

In the grain-oriented electrical steel sheet according to the invention, the misorientation angle in the second small peak among the plural peaks is not less than 5°.

Also, the grain-oriented electrical steel sheet according to the invention contains C: less than 0.005 mass % and Mn: 0.005-1.0 mass % in addition to Si.

Further, the grain-oriented electrical steel sheet according to the invention contains one or more selected from Ni: 0.010-1.50 mass %, Cr: 0.01-0.50 mass %, Cu: 0.01-0.50 mass %, P: 0.005-0.50 mass %, Sn: 0.005-0.50 mass %, Sb: 0.005-0.50 mass %, Bi: 0.005-0.50 mass % and Mo: 0.005-0.100 mass % in addition to the above ingredients.

Effect of the Invention

The invention can provide grain-oriented electrical steel sheets with the iron loss lower than that of the conventional material without performing excessive rapid heating, so that it is significant in the effects attained in industry.

EMBODIMENTS FOR CARRYING OUT THE INVENTION

At first, there will be described an experiment leading to success of the invention.

A steel slab containing C: 0.055 mass %, Si: 3.25 mass %, Mn: 0.09 mass %, Al: 0.021 mass %, N: 0.0082 mass % and Se: 0.015 mass % is made by continuous casting, reheated to a temperature of 1410° C., hot-rolled to provide a hot rolled sheet of 2.2 mm in thickness, subjected to a hot band annealing at 1000° C. for 60 seconds, cold-rolled to an intermediate thickness of 1.8 mm, subjected to an intermediate annealing at 1120° C. for 60 seconds and then warm-rolled at a temperature of 200° C. to form a cold rolled sheet having a final thickness of 0.27 mm.

Figure 1:
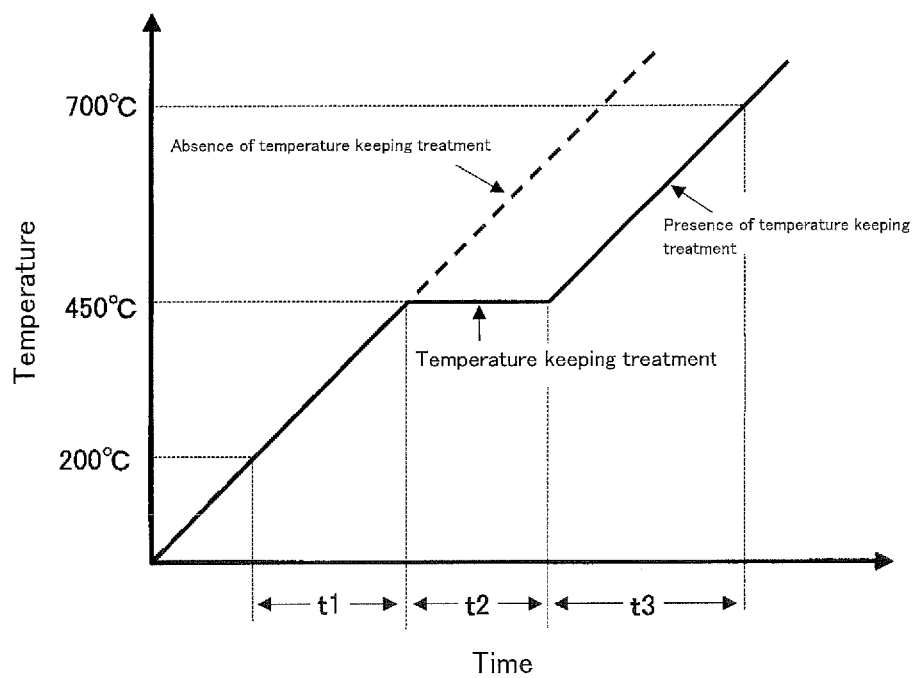
FIG. 1 is a view showing a heating pattern of primary recrystallization annealing.

Then, the cold rolled sheet is subjected to primary recrystallization annealing combined with decarburization annealing at 840° C. for 80 seconds in a wet atmosphere of 50 vol % $H_2$—50 vol % $N_2$ having a dew point of 60° C. In this case, heating from 200° C. to 700° C. is performed under two conditions that a heating rate is 20° C./s and 120° C./s and further under two conditions that temperature keeping treatment for 4 seconds is carried out or is not carried out at a temperature of 450° C. in the course of heating as shown in FIG. 1 while the heating rate is constant (4 conditions in total). Here, the heating rate is a value assumed when the heating from 200° C. to 700° C. is performed for a time omitting the temperature keeping time (a time (t1+t3) in FIG. 1). Moreover, heating from 700° C. to soaking temperature is performed at 10° C./s.

Thereafter, the steel sheet subjected to the primary recrystallization annealing is coated on its steel sheet surface with an annealing separator composed mainly of MgO and then subjected to a finishing annealing comprising a secondary recrystallization annealing and a purification annealing keeping at a temperature of 1200° C. in a hydrogen atmosphere for 7 hours to obtain a grain-oriented electrical steel sheet.

Figure 2:
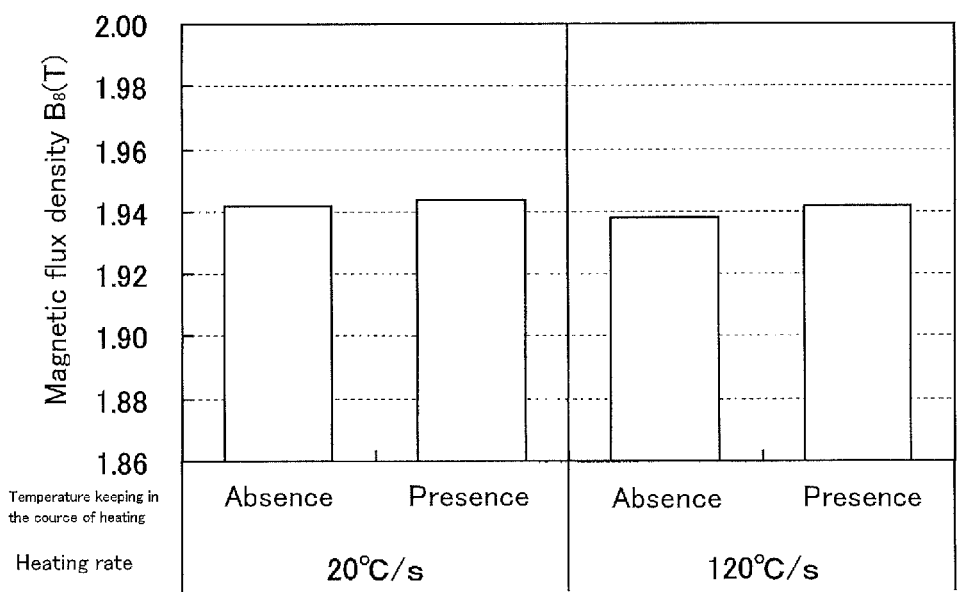
FIG. 2 is a graph showing an influence of heating rate of primary recrystallization annealing and presence or absence of temperature keeping in the course of heating upon magnetic flux density $B_8$.
Figure 3:
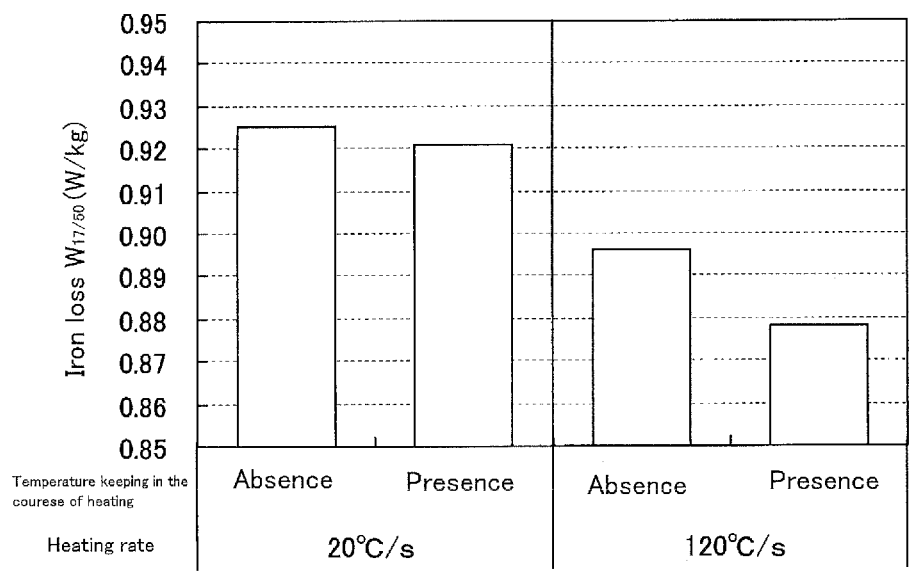
FIG. 3 is a graph showing an influence of heating rate of primary recrystallization annealing and presence or absence of temperature keeping in the course of heating upon iron loss $W_{17/50}$.

After a test specimen is taken out from the product sheet thus obtained, magnetic flux density $B_8$ and iron loss $W_{17/50}$ are measured by a method described in JIS C2550 to obtain results shown in FIGS. 2 and 3. As seen from these results, the magnetic flux density $B_8$ is small in the difference among the heating conditions and indicates approximately equal values in the four conditions, whereas the iron loss $W_{17/50}$ differs in accordance with the heating condition, and the iron loss is largely improved at the heating rate of 120° C./s as compared to the heating rate of 20° C./s, and particularly the iron loss is further improved when the temperature keeping is performed at 450° C. in the course of heating.

Figure 4:
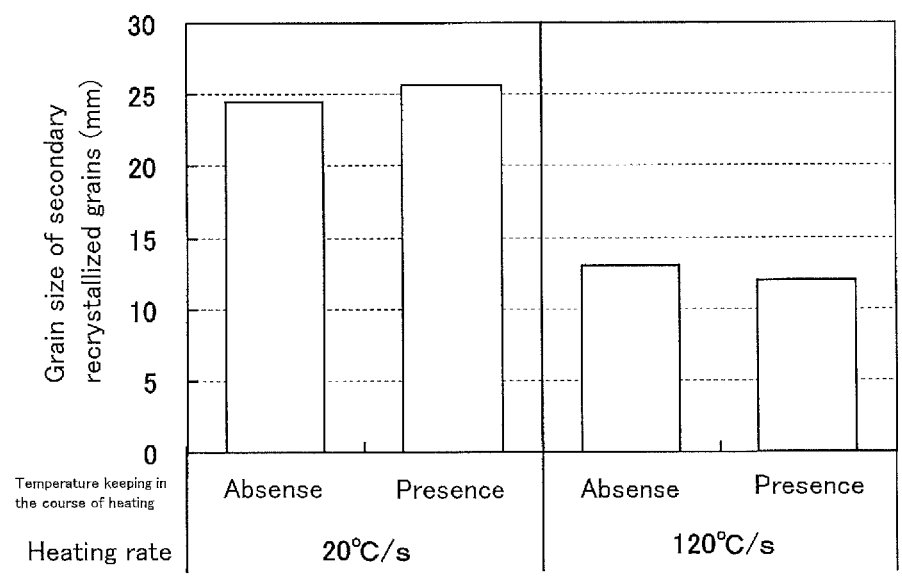
FIG. 4 is a graph showing an influence of heating rate of primary recrystallization annealing and presence or absence of temperature keeping in the course of heating upon grain size of secondary recrystallized grains.

In order to examine the reason of significantly improving the iron loss when the rapid heating is performed and the temperature keeping is performed in the course of heating, the test specimens of the above four conditions are immersed in an aqueous solution of 10 mass % HCl at 80° C. for 2 minutes to remove forsterite coating and a size of secondary recrystallized grains is measured from a macroscopic appearance of an iron matrix portion. Moreover, the grain size of the secondary recrystallized grains is an average value calculated from 200 or more grains by inputting the macroscopic structure image into a computer, recognizing grain boundaries through image processing, and approximating the grain boundary to an ellipsoid through least squares method to determine a mean value of major axis and minor axis. However, fine grains of not more than 1 mm are assumed to be not secondary recrystallized grains, which are ignored. The measured results are shown in FIG. 4, from which it can be seen that the grain size of the secondary recrystallized grains is high in the heating rate dependency and as the heating rate becomes faster, the grain size becomes smaller. It is guessed from this result that the reason of reducing the iron loss under the fast heating rate is due to the fact that the secondary recrystallized grains become small. However, since the grain size of the secondary recrystallized grains makes a little difference between the presence and absence of the temperature keeping in the course of the heating even under the fast heating rate in FIG. 4, there is suggested a possibility of being affected by another factor.

Figure 5:
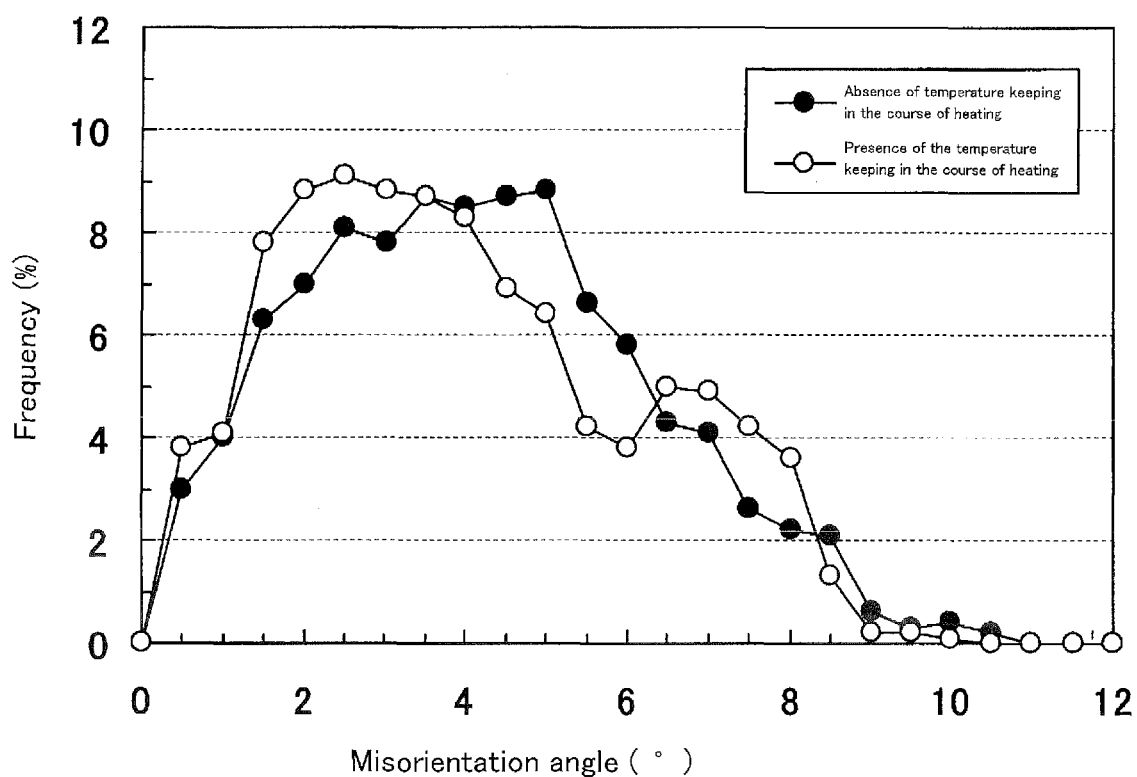
FIG. 5 is a graph showing an influence of presence or absence of temperature keeping in the course of heating for primary recrystallization annealing upon magnetic flux density.

In order to examine the cause of generating the difference of iron loss property between the presence and absence of the temperature keeping in the course of heating, crystal orientation of the secondary recrystallized grains is measured by a Laue method on the presence or absence of the temperature keeping at a temperature rising rate of 120° C./s. Moreover, the measurement of the crystal orientation is performed over an area of 1000 mm×1000 mm in the product sheet at 1089 points in total separated at intervals of 30 mm in the widthwise and longitudinal directions. Then, misorientation angle between crystal orientation of the secondary recrystallized grains and ideal Goss orientation is calculated from the measured results with respect to all of the 1089 points, and existence frequency (%) of crystal grains having such a misorientation angle is pictured by a histogram at a misorientation angle pitch of 0.5° in FIG. 5 (which is called "misorientation angle distribution diagram" hereinafter). As seen from this figure, one peak is existent at the misorientation angle of about 4° in case of no temperature keeping, while two peaks are existent at the misorientation angles of about 2.5° and about 6.5° in case of the temperature keeping. It is guessed that the iron loss is reduced by the presence of the two peaks.

Although the reason why the iron loss is considerably improved when two peaks are existent in the distribution of the misorientation is not clear sufficiently at this time, the inventors think as follows.

The degree of iron loss is significantly influenced by magnetic domain structure in the secondary recrystallized grains. Almost all of the grain-oriented electrical steel sheets are constructed with magnetic domains called 180° domains substantially parallel to the rolling direction. Therefore, the width of such domains largely acts on the iron loss property. As the width becomes narrower, the iron loss can be reduced. For example, there is a magnetic domain refining treatment of mechanically forming linear grooves in the steel sheet. This method utilizes characteristics that since the magnetostatic energy of groove section is increased by the formation of the grooves, the increase of such energy is overcome by narrowing the width of the magnetic domain.

When only one peak is existent in the misorientation angle distribution, it can be considered that the secondary recrystallized grains are constituted with crystal grains having close crystal orientations. Therefore, magnetostatic energy in the grain boundary formed by the two neighboring crystal grains is at a low level because the crystal orientations are close to each other.

On the other hand, when two or more peaks are existent in the misorientation angle distribution, grains belonging to peaks of different misorientation angles may be adjacent to each other. In this case, misorientation angle of the adjacent grains becomes large, and hence magnetostatic energy in the grain boundary becomes high. Consequently, the width of the magnetic domain is considered to become narrow for decreasing the high magnetostatic energy, which is guessed to be a cause for further improving the iron loss.

However, as the width of the magnetic domain becomes narrow, quantity of magnetic domain walls increases, so that it is necessary to consider balance between decrease of magnetostatic energy and increase of magnetic domain wall energy. That is, when the crystal grain size is small, the increasing quantity of the magnetic domain walls is decreased and hence the increasing margin of magnetic domain wall energy is decreased. Accordingly, as the crystal grain size becomes smaller, it is suitable to receive the effect by decreasing the width of the magnetic domain.

As mentioned above, the reason for significantly improving the iron loss in the steel sheets subjected to rapid heating and temperature keeping treatment in the course of heating is considered by the synergetic effect of the two peaks in the misorientation angle distribution and the small crystal grain size. The invention is based on the above new knowledge.

There will be described the chemical composition of the grain-oriented electrical steel sheet (product sheet) according to the invention below.

Si: 2.0-5.0 mass %

Si is an element required for enhancing a specific resistance of steel and improving iron loss. However, when Si content is less than 2.0 mass %, the effect of reducing the iron loss is not sufficient, while when it exceeds 5.0 mass %, the workability of steel is deteriorated and cutting or slit processing is difficult when it is used in a transformer or the like. Therefore, Si content is in the range of 2.0~5.0 mass %. It is preferably in the range of 3.0~3.7 mass %.

Moreover, the remainder other than Si in the grain-oriented electrical steel sheet according to the invention is Fe and inevitable impurities. However, C and Mn are preferable to be included in the following range.

C: less than 0.005 mass %

C is an element causing magnetic aging to deteriorate the magnetic properties. In order to suppress the magnetic aging, it is preferable that C included in the product sheet is decreased to less than 0.005 mass %. More preferably, it is not more than 0.003 mass %.

Mn: 0.005-1.0 mass %

Mn is an element effective for improving hot workability, and is preferable to be included in not less than 0.005 mass % in a raw steel material for obtaining the above effect. However, the addition exceeding 1.0 mass % brings about the decrease of the magnetic flux density, so that the upper limit is preferable to be 1.0 mass %. More preferably, it is in a range of 0.02-0.20 mass %.

For the purpose of reducing the iron loss, the grain-oriented electrical steel sheet according to the invention may further contain one or more selected from Cr: 0.01-0.50 mass %, Cu: 0.01-0.50 mass % and P: 0.005-0.50 mass %. For the purpose of increasing the magnetic flux density, the grain-oriented electrical steel sheet according to the invention may also contain one or more selected from Ni: 0.010-1.50 mass %, Sb: 0.005-0.50 mass %, Sn: 0.005-0.50 mass %, Bi: 0.005-0.50 mass % and Mo: 0.005-0.100 mass % in addition to the above ingredients. When each of the contents is less than the lower limit, the sufficient addition effect is not obtained, while when it exceeds the upper limit, the secondary recrystallization becomes unstable or the decrease of the magnetic flux density is caused.

The grain-oriented electrical steel sheet according to the invention will be described below.

Firstly, the grain-oriented electrical steel sheet according to the invention is necessary to have two or more peaks in the distribution of misorientation angle between crystal orientation of secondary recrystallized grains and Goss orientation. Here, the peak in the misorientation angle distribution is a peak recognized in a misorientation angle distribution diagram when a misorientation angle between the crystal orientation of the secondary recrystallized grains and the ideal Goss orientation and the existence frequency (%) of crystal grains having such a misorientation angle are pictured by a histogram at a misorientation angle pitch of 0.5°, wherein the first peak, the second peak . . . are called in order from the smallest misorientation angle. Moreover, the second peak is judged to be existent when two or more points of frequency value are continuously existent with respect to minimum frequency value between the first peak and the second peak. Therefore, a plateau portion is not presumed as a peak.

From a viewpoint of improving the iron loss property, it is preferable that a certain interval is existent between the first peak and the second peak as previously mentioned and the misorientation angle of the second peak is preferable to be not less than 5°. However, as the misorientation angle becomes too large, the magnetic properties of the grains themselves are deteriorated and the iron loss as a whole of the steel sheet is increased, so that the misorientation angle of the second peak is preferable to be not more than 10°. Moreover, the number of peaks recognized in the misorientation angle distribution diagram is not limited to 2 and may be 3 or more.

In the grain-oriented electrical steel sheet according to the invention, the grain size of the secondary recrystallized grains is necessary to be not more than 15 mm Here, the grain size of the secondary recrystallized grains means an average value when a mean of major axis and minor axis in an ellipsoidal approximation of the grain boundary in a macroscopic structure is measured on 200 or more grains. As previously mentioned, when the grain size of the secondary recrystallized grains is large, the decreasing margin of the width of the magnetic domain becomes small and the effect of reducing the iron loss becomes small because the volume of the domain wall significantly increases in case of the decrease of the magnetic domain width and the resultant increase of the magnetic domain number. Hence, the grain size of the secondary recrystallized grains is necessary to be not more than 15 mm Preferably, it is not more than 12 mm.

The method of producing the grain-oriented electrical steel sheet according to the invention will be described below.

The grain-oriented electrical steel sheet according to the invention can be produced by a general method as the production method of the grain-oriented electrical steel sheet, or a method wherein steel having a given chemical composition is melted and shaped into a steel slab, which is subjected to a hot rolling, a hot band annealing, if necessary, a cold rolling, a primary recrystallization annealing or a primary recrystallization annealing combined with decarburization annealing, a finishing annealing, and a coating with an insulating film, if necessary.

The steel slab is produced by melting steel adjusted to a given chemical composition through a usual refining process and shaping into a steel slab through a usual continuous casting process, an ingot making-blooming process or the like. Alternatively, it may be produced as a thin cast slab with a thickness of not more than 100 mm by a direct casting process. Moreover, the aforementioned optional ingredients are difficult to be added in the course of the production process, so that they are preferable to be previously adjusted to given ranges at the steel-making stage.

When the steel slab contains inhibitor ingredients such as Al, N, Se, S and the like, in order to dissolve these elements prior to the subsequent hot rolling, it is preferable that the slab is re-heated to a high temperature of about 1400° C. prior to the hot rolling. On the other hand, when the slab does not contain the inhibitor ingredient, the re-heating temperature of the slab can be made to not higher than 1250° C., or the slab after the production can be directly subjected to hot rolling without re-heating as long as the hot rolling temperature can be ensured. Also, the thin cast slab may be subjected to hot rolling, or may be promoted to subsequent step with omission of hot rolling as it is.

Then, the slab is hot rolled according to the usual manner and the resulting steel sheet (hot rolled sheet) is subjected to hot band annealing, if necessary. The temperature of the hot band annealing is preferable to be a range of 800-1150° C. for providing good magnetic properties. When it is lower than 800° C., it is difficult to obtain primary recrystallization structure of uniformly-sized grains because a band structure formed by hot rolling is retained, which may obstruct the growth of secondary recrystallized grains. While, when it exceeds 1150° C., the grain size after the hot band annealing is significantly coarsened, and hence it is also difficult to obtain primary recrystallization structure of uniformly-sized grains.

Next, the steel sheet after the hot rolling or after the hot band annealing is subjected to a single cold rolling or two or more cold rollings with an intermediate annealing therebetween to form a cold rolled sheet with a final thickness. The temperature of the intermediate annealing is preferable to be in the range of 900-1200° C. When it is lower than 900° C., the recrystallized grains are refined to decrease Goss nuclei in the primary recrystallization structure, and there is a risk of deteriorating the magnetic properties. While, when it exceeds 1200° C., the grain size is coarsened too much like the hot band annealing, and hence it is difficult to obtain primary recrystallization structure of uniformly-sized grains. Moreover, since the final cold rolling to a final thickness improves the primary recrystallization texture and the magnetic properties, it is preferable that the steel sheet temperature during the rolling is raised to 100-300° C. or aging at a temperature of 100-300° C. is performed one or plural times in the course of the cold rolling.

Thereafter, the cold rolled sheet with the final thickness is subjected to primary recrystallization annealing, which is the most important step for providing the grain-oriented electrical steel sheet according to the invention. The primary recrystallization annealing may be combined with decarburization annealing. In case of performing the decarburization annealing, the annealing is preferably performed within a temperature range of 800-900° C. in a wet atmosphere from a viewpoint of ensuring the decarburizing property. However, when C content in the starting material is less than 0.0050 mass % causing no magnetic aging, the decarburization annealing can be omitted.

It is important for obtaining the grain-oriented electrical steel sheet according to the invention that the heating in the primary recrystallization annealing is performed by the rapid heating and the temperature keeping for several seconds in the course of the heating as previously mentioned. Concretely, it is preferable that the rapid heating is performed from 200° C. to 700° C. at a heating rate of not less than 50° C./s, more preferably not less than 80° C./s. Moreover, the upper limit of the heating rate is not limited from a viewpoint of the magnetic properties, but it is desirable to be about 300° C./s in view of equipment cost or production cost because power input to the heating apparatus is increased as the heating rate becomes excessively higher.

Also, the temperature of the temperature keeping treatment in the course of the heating is preferable to be in the range of 250-600° C. causing the recovery of rolled structure but causing no recrystallization. From the same viewpoint, the temperature keeping time is preferable to be in the range of 1-30 seconds causing the recovery but causing no recrystallization, more preferably in the range of 1-10 seconds. However, the keeping temperature is not necessarily to be always constant and variation of about ±15° C. is accepted as long as it is not departed from the above temperature range.

Thereafter, the cold rolled sheet subjected to the primary recrystallization annealing is coated on the steel sheet surface with an annealing separator composed mainly of MgO and subjected to finishing annealing when the iron loss is considered to be important, whereby secondary recrystallization structure is grown and at the same time forsterite film is formed on the steel sheet surface. On the other hand, when the punching processability is considered to be important, the secondary recrystallization structure is grown by subjecting to the finishing annealing without applying the annealing separator or after the application of an annealing separator forming no forsterite film, i.e., containing no MgO and composed mainly of silica, alumina or the like. When the annealing separator is applied to the steel sheet surface, it is preferable to adopt an electrostatic coating taking no moisture. Also, a method of inserting a heat-resistant inorganic material sheet (silica, alumina, mica or the like) between steel sheets in coiling may be adopted instead of applying the annealing separator.

In order to develop and complete secondary recrystallization, the finishing annealing is desirable to be performed by keeping a temperature of not lower than 800° C. for not less than 20 hours. When the punching property is considered to be important to form no forsterite film, it is enough to complete secondary recrystallization, so that the keeping temperature is preferably 850-950° C. It is possible to complete finishing annealing by simply keeping this temperature. On the other hand, when the iron loss is considered to be important or when forsterite film is formed for reducing noise in the transformer, it is preferable to raise the temperature to about 1200° C. after the secondary recrystallization and perform purification annealing in a hydrogen atmosphere.

Then, the steel sheet subjected to finishing annealing is preferable to be subjected to flattening annealing for shape correction or reduction of iron loss after unreacted annealing separator attached to the steel sheet surface is removed by washing, brushing, pickling or the like. When the steel sheets are used at a laminated state, it is effective to coat the steel sheet surface with an insulating film before or after the flattening annealing in order to improve the iron loss. The insulating film is preferable to be a tension-applying film capable of applying tension to the steel sheet from a viewpoint of reducing the iron loss. Also, a method of coating the tension-applying film through a binder, and a method of depositing an inorganic material onto a surface layer of the steel sheet through a physical vapor deposition, a chemical vapor deposition or the like to obtain an insulating film can be preferably applied because the film is excellent in the adhesion property and a film having a large effect of reducing iron loss is obtained.

In order to realize a lower iron loss, it is desirable to perform a magnetic domain refining treatment. As the magnetic domain refinement can be preferably used a method wherein grooves are formed on a surface of an intermediate product sheet such as final cold rolled sheet or the like by a usual manner, or mechanical strain such as grooves or the like is applied to a surface of a final product sheet with rollers or the like, or heat strain or impact strain is linearly applied by irradiating a laser, plasma or the like.

Example 1

A steel slab containing C: 0.071 mass %, Si: 3.44 mass %, Mn: 0.12 mass %, Al: 0.028 mass %, Se: 0.015 mass %, Cu: 0.05 mass % and Sb: 0.03 mass % is produced by continuous casting, reheated to a temperature of 1400° C., hot rolled to form a hot rolled sheet of 2.2 mm in thickness, which is subjected to a hot band annealing at 1020° C. for 30 seconds, cold rolled to a thickness of 1.7 mm, subjected to an intermediate annealing at 1100° C. for 60 seconds and then warm rolled at a temperature of 150° C. to obtain a cold rolled sheet having a final thickness of 0.27 mm.

Then, the cold rolled sheet is subjected to primary recrystallization annealing combined with decarburization annealing at 850° C. in a wet atmosphere of 50 vol % $H_2$— 50 vol % $N_2$ and having a dew point of 55° C. for 80 seconds. In this case, a zone from 200° C. to 700° C. in the heating process to 850° C. is heated by changing a heating rate within the range of 25-500° C./s as shown in Table 1 and further conducting temperature keeping at a temperature of 500° C. in the course of the heating for 2 seconds while maintaining the heating rate constant or conducting no temperature keeping. Also, the heating from 700° C. to soaking temperature is performed at a heating rate of 10° C./s.

After an annealing separator composed mainly of MgO is applied onto the steel sheet surface after the primary recrystallization annealing, the sheet is subjected to secondary recrystallization and further to finishing annealing for purification treatment of keeping a temperature of 1200° C. in $H_2$ atmosphere for 5 hours to obtain a product sheet of a grain-oriented electrical steel sheet.

A test specimen is taken out from the product sheet thus obtained to measure iron loss $W_{17/50}$ by a method described in JIS C2550.

Also, the test specimen is immersed in an aqueous solution of 10 mass % HCl at 80° C. for 2 minutes to remove forsterite film and then a grain size of secondary recrystallized grains is measured from macroscopic appearance of an iron matrix. Moreover, the grain size of the secondary recrystallized grains is a mean of major axis and minor axis in an ellipsoid approximated by inputting a macroscopic structure image into a computer and recognizing grain boundaries through image processing. However, fine grains of not more than 1 mm are assumed to be not secondary recrystallized grains, which are ignored.

Further, crystal orientation of the secondary recrystallized grains is measured on an area of 1000 mm×1000 mm in the product sheet at 1089 points in total separated at intervals of 30 mm in the widthwise and longitudinal directions through a Laue method, and a misorientation angle distribution diagram is obtained by calculating a misorientation angle of the obtained orientation to Goss orientation. Moreover, the misorientation angle distribution diagram is pictured by histogram at a pitch of 0.5° to judge whether or not two or more peaks are existent. When two or more peaks are existent, a misorientation angle existing the second peak is determined.

The measured results are shown in Table 1 together with heating conditions of the primary recrystallization annealing. As seen from these results, the steel sheets satisfying the conditions of the invention reduce the iron loss without making the heating rate excessively faster.

Moreover, when the ingredients of the test specimen after the removal of the film are analyzed for confirming the chemical composition of the product sheet, all of the sheets contain C: 0.003 mass %, Si: 3.44 mass %, Mn: 0.12 mass %, Cu: 0.05 mass % and Sb: 0.03 mass %, while Al and Se are not more than detection limit (not more than 0.0010 mass %).

TABLE 1

| | Heating conditions | | Characteristics of steel sheet | | | |
|---|---|---|---|---|---|---|
| No. | Heating rate (° C./s) | Presence or absence of temperature keeping in the course of heating | Grain size of secondary recrystallized grains (mm) | Position of second peak (°) | Iron loss $W_{17/50}$ (W/kg) | Remarks |
| 1 | 25 | absence | <u>22.4</u> | none | 0.934 | Comparative Example |
| 2 | 25 | presence | <u>19.6</u> | 9.0 | 0.928 | Comparative Example |

TABLE 1-continued

| | Heating conditions | | Characteristics of steel sheet | | | |
|---|---|---|---|---|---|---|
| No. | Heating rate (° C./s) | Presence or absence of temperature keeping in the course of heating | Grain size of secondary recrystallized grains (mm) | Position of second peak (°) | Iron loss $W_{17/50}$ (W/kg) | Remarks |
| 3 | 50 | absence | 14.3 | none | 0.897 | Comparative Example |
| 4 | 50 | presence | 14.8 | 8.0 | 0.880 | Invention Example |
| 5 | 75 | absence | 13.7 | none | 0.895 | Comparative Example |
| 6 | 75 | presence | 13.0 | 7.5 | 0.878 | Invention Example |
| 7 | 100 | absence | 11.9 | none | 0.895 | Comparative Example |
| 8 | 100 | presence | 11.7 | 7.5 | 0.871 | Invention Example |
| 9 | 150 | absence | 9.7 | none | 0.889 | Comparative Example |
| 10 | 150 | presence | 8.9 | 6.5 | 0.870 | Invention Example |
| 11 | 200 | absence | 8.6 | none | 0.888 | Comparative Example |
| 12 | 200 | presence | 8.1 | 7.0 | 0.867 | Invention Example |
| 13 | 300 | absence | 7.9 | none | 0.884 | Comparative Example |
| 14 | 300 | presence | 7.5 | 6.5 | 0.865 | Invention Example |
| 15 | 500 | absence | 7.7 | none | 0.885 | Comparative Example |
| 16 | 500 | presence | 7.8 | 8.0 | 0.869 | Invention Example |

Example 2

A steel slab having a chemical composition shown in Table 2 is produced by continuous casting, reheated to a temperature of 1400° C. and hot rolled to form a hot rolled sheet of 2.8 mm in thickness, which is subjected to a hot band annealing at 1000° C. for 45 seconds, cold rolled to a thickness of 1.5 mm, subjected to an intermediate annealing at 1100° C. for 45 seconds and then warm rolled at a temperature of 220° C. to obtain a cold rolled sheet having a final thickness of 0.23 mm.

Then, the cold rolled sheet is subjected to primary recrystallization annealing combined with decarburization annealing at 850° C. in a wet atmosphere of 50 vol % $H_2$— 50 vol % $N_2$ and having a dew point of 61° C. for 80 seconds. In this case, a zone from 200° C. to 700° C. in the heating process to 850° C. is heated at a heating rate of 150° C./s provided that temperature keeping is performed at a temperature of 400° C. in the course of the heating for 1.5 seconds. Also, the heating from 700° C. to soaking temperature is performed at a heating rate of 10° C./s.

After an annealing separator composed mainly of MgO is applied onto the steel sheet surface after the primary recrystallization annealing, the sheet is subjected to secondary recrystallization and further to finishing annealing by purification treatment of keeping a temperature of 1200° C. in $H_2$ atmosphere for 10 hours to obtain a product sheet of a grain-oriented electrical steel sheet.

A test specimen is taken out from the product sheet thus obtained to measure iron loss $W_{17/50}$ by a method described in JIS C2550.

Also, grain size of secondary recrystallized grains and misorientation angle between crystal orientation and Goss orientation are measured by the same method as in Example 1 to obtain a misorientation angle distribution diagram, and when the second peak is existent, a misorientation angle thereof is determined.

The results are shown in Table 3. As a reference, analysis of ingredients in the steel sheet after the removal of film in the examples is conducted to obtain results shown in Table 3. As seen from this table, all of the steel sheets satisfying the conditions of the invention are excellent in the iron loss property. Moreover, all steel sheets of Invention Examples have two or more peaks in their misorientation angle distribution diagrams.

TABLE 2

| | Chemical composition of steel slab (mass %) | | | | | | | | |
|---|---|---|---|---|---|---|---|---|---|
| No. | C | Si | Mn | Se | Al | N | S | others | Remarks |
| 1 | 0.074 | 3.45 | 0.09 | 0.012 | 0.045 | 0.0130 | 0.0021 | — | Invention Example |
| 2 | 0.072 | 1.55 | 0.07 | 0.008 | 0.028 | 0.0087 | 0.0015 | — | Comparative Example |
| 3 | 0.072 | 3.34 | 0.07 | 0.011 | 0.026 | 0.0088 | 0.0041 | — | Invention Example |
| 4 | 0.069 | 3.32 | 0.25 | 0.015 | 0.026 | 0.0081 | 0.0023 | Ni: 0.12, Cr: 0.06, P: 0.012 | Invention Example |
| 5 | 0.075 | 3.05 | 0.57 | 0.021 | 0.025 | 0.0085 | 0.0022 | Cu: 0.06, P: 0.008, Sb: 0.043 | Invention Example |
| 6 | 0.072 | 3.41 | 0.12 | 0.011 | 0.027 | 0.0089 | 0.0022 | Sn: 0.075, Bi: 0.022, Mo: 0.021 | Invention Example |
| 7 | 0.045 | 3.38 | 0.20 | 0.009 | 0.045 | 0.0110 | 0.0020 | Cr: 0.10, Cu: 0.08, Sb: 0.025 | Invention Example |

* "—" in the column of chemical composition shows not more than analysis limit (0.001 mass %)

TABLE 3

| | Chemical composition of product sheet (mass %) | | | | Characteristics of steel sheet | | | |
|---|---|---|---|---|---|---|---|---|
| | | | | | Grain size of secondary recrystallized grains (mm) | Position of second peak (°) | Iron loss $W_{17/50}$ (W/kg) | |
| No. | C | Si | Mn | others | | | | Remarks |
| 1 | 0.0032 | 3.45 | 0.09 | — | 11.4 | 7.5 | 0.845 | Invention Example |
| 2 | 0.0025 | <u>1.53</u> | 0.07 | — | 13.5 | 6.5 | 1.323 | Comparative Example |
| 3 | 0.0023 | 3.33 | 0.07 | — | 12.7 | 5.5 | 0.836 | Invention Example |
| 4 | 0.0018 | 3.32 | 0.24 | Ni: 0.12, Cr: 0.05, P: 0.011 | 12.8 | 6.0 | 0.827 | Invention Example |
| 5 | 0.0024 | 3.05 | 0.57 | Cu: 0.06, P: 0.008, Sb: 0.042 | 14.3 | 9.5 | 0.829 | Invention Example |
| 6 | 0.0028 | 3.40 | 0.12 | Sn: 0.075, Bi: 0.022, Mo: 0.02 | 10.5 | 7.0 | 0.835 | Invention Example |
| 7 | 0.0026 | 3.36 | 0.21 | Cr: 0.10, Cu: 0.08, Sb: 0.023 | 12.5 | 7.0 | 0.814 | Invention Example |

\* "—" in the column of chemical composition shows not more than analysis limit (0.001 mass %).

INDUSTRIAL APPLICABILITY

The technique of the invention can be also applied to steel sheets for automobiles requiring the control of texture and so on.

The invention claimed is:

1. A grain-oriented electrical steel sheet comprising Si: 2-5 mass %, and having plural peaks in a distribution of misorientation angle between crystal orientation of secondary recrystallized grains and Goss orientation and a grain size of secondary recrystallized grains of not more than 15 mm.

2. The grain-oriented electrical steel sheet according to claim 1, wherein the misorientation angle in a second small peak among the plural peaks is not less than 5°.

3. The grain-oriented electrical steel sheet according to claim 1, further comprising C: less than 0.005 mass % and Mn: 0.005-1.0 mass %.

4. The grain-oriented electrical steel sheet according to claim 1, further comprising at least one selected from the group consisting of Ni: 0.010-1.50 mass %, Cr: 0.01-0.50 mass %, Cu: 0.01-0.50 mass %, P: 0.005-0.50 mass %, Sn: 0.005-0.50 mass %, Sb: 0.005-0.50 mass %, Bi: 0.005-0.50 mass % and Mo: 0.005-0.100 mass %.

5. The grain-oriented electrical steel sheet according to claim 2, further comprising C: less than 0.005 mass % and Mn: 0.005-1.0 mass %.

6. The grain-oriented electrical steel sheet according to claim 2, further comprising at least one selected from the group consisting of Ni: 0.010-1.50 mass %, Cr: 0.01-0.50 mass %, Cu: 0.01-0.50 mass %, P: 0.005-0.50 mass %, Sn: 0.005-0.50 mass %, Sb: 0.005-0.50 mass %, Bi: 0.005-0.50 mass % and Mo: 0.005-0.100 mass %.

7. The grain-oriented electrical steel sheet according to claim 3, further comprising at least one selected from the group consisting of Ni: 0.010-1.50 mass %, Cr: 0.01-0.50 mass %, Cu: 0.01-0.50 mass %, P: 0.005-0.50 mass %, Sn: 0.005-0.50 mass %, Sb: 0.005-0.50 mass %, Bi: 0.005-0.50 mass % and Mo: 0.005-0.100 mass %.

8. The grain-oriented electrical steel sheet according to claim 5, further comprising at least one selected from the group consisting of Ni: 0.010-1.50 mass %, Cr: 0.01-0.50 mass %, Cu: 0.01-0.50 mass %, P: 0.005-0.50 mass %, Sn: 0.005-0.50 mass %, Sb: 0.005-0.50 mass %, Bi: 0.005-0.50 mass % and Mo: 0.005-0.100 mass %.

9. The grain-oriented electrical steel sheet according to claim 2, wherein the misorientation angle for the second small peak is in a range of 5° or more and 10° or less.

10. The grain-oriented electrical steel sheet according to claim 1, wherein the misorientation angle is a rotation angle rotated in such a manner that <001> orientation of the secondary recrystallized grain is overlapped with an RD axis with respect to a z-axis as a central axis.

\* \* \* \* \*